United States Patent
Li et al.

(10) Patent No.: US 12,081,658 B2
(45) Date of Patent: Sep. 3, 2024

(54) KEY GENERATION METHOD AND APPARATUS, DEVICE, AND MEDIUM

(71) Applicant: TENCENT TECHNOLOGY (SHENZHEN) COMPANY LIMITED, Shenzhen (CN)

(72) Inventors: Maocai Li, Shenzhen (CN); Zongyou Wang, Shenzhen (CN); Jinsong Zhang, Shenzhen (CN); Huankun Huang, Shenzhen (CN); Kaiban Zhou, Shenzhen (CN); Yifang Shi, Shenzhen (CN); Qucheng Liu, Shenzhen (CN); Pan Liu, Shenzhen (CN); Hu Lan, Shenzhen (CN); Changqing Yang, Shenzhen (CN); Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 260 days.

(21) Appl. No.: 17/720,274

(22) Filed: Apr. 13, 2022

(65) Prior Publication Data
US 2022/0311607 A1     Sep. 29, 2022

Related U.S. Application Data

(63) Continuation of application No. PCT/CN2021/077374, filed on Feb. 23, 2021.

(30) Foreign Application Priority Data

Apr. 9, 2020 (CN) .......................... 202010277116.5

(51) Int. Cl.
*H04L 9/08*     (2006.01)
*H04L 9/00*     (2022.01)
*H04L 9/32*     (2006.01)

(52) U.S. Cl.
CPC .......... *H04L 9/0869* (2013.01); *H04L 9/0838* (2013.01); *H04L 9/3247* (2013.01); *H04L 9/50* (2022.05)

(58) Field of Classification Search
None
See application file for complete search history.

(56) References Cited

U.S. PATENT DOCUMENTS 10,402,823 B1     9/2019   Vlasov et al.
10,790,979 B1 *   9/2020   Yu ......................... G06F 21/606
(Continued)

FOREIGN PATENT DOCUMENTS

CN     106533675 A     3/2017
CN     107204846 A     9/2017
(Continued)

OTHER PUBLICATIONS

The State Intellectual Property Office of the People's Republic of China (SIPO) Office Action 1 for for 202010277116.5 Jun. 1, 2021 8 Pages (including translation).
(Continued)

*Primary Examiner* — Scott B Christensen
(74) *Attorney, Agent, or Firm* — ANOVA LAW GROUP PLLC

(57) ABSTRACT

This application discloses a key generation method and apparatus, a device, and a medium. The method includes transmitting a key negotiation request to a consensus node in a blockchain network, to request a key verification parameter; negotiating a collaboration key pair with a second device to obtain a first private key component and a shared public key in the collaboration key pair; signing the key verification parameter by using the first private key component, to obtain a first signature component; generating transaction data according to the first signature component (Continued)

and the key verification parameter; transmitting the transaction data to the second device. The consensus node performs a consensus on the negotiation result data, and after the negotiation result data passes the consensus, submits the negotiation result data to a blockchain of the blockchain network.

20 Claims, 7 Drawing Sheets

(56) References Cited

U.S. PATENT DOCUMENTS

| | | | | |
|---|---|---|---|---|
| 11,876,914 | B2* | 1/2024 | Kaehler | H04L 63/1483 |
| 2020/0074464 | A1 | 3/2020 | Trevethan | |
| 2020/0082405 | A1 | 3/2020 | Li et al. | |
| 2020/0092106 | A1 | 3/2020 | Leong | |
| 2020/0389321 | A1 | 12/2020 | Fletcher et al. | |

FOREIGN PATENT DOCUMENTS

| | | |
|---|---|---|
| CN | 107623569 A | 1/2018 |
| CN | 109246129 A | 1/2019 |
| CN | 109728903 A | 5/2019 |
| CN | 109861816 A | 6/2019 |
| CN | 109872155 A | 6/2019 |
| CN | 109934582 A | 6/2019 |
| CN | 110278088 A | 9/2019 |
| CN | 110574059 A | 12/2019 |
| CN | 110932850 A | 3/2020 |
| CN | 110933125 A | 3/2020 |
| CN | 111489159 A | 8/2020 |
| CN | 111490878 A | 8/2020 |

OTHER PUBLICATIONS

The World Intellectual Property Organization (WIPO) International Search Report for PCT/CN2021/077374 May 11, 2021 6 Pages (including translation).

* cited by examiner

KEY GENERATION METHOD AND APPARATUS, DEVICE, AND MEDIUM

RELATED APPLICATIONS

This application is a continuation of PCT Application No. PCT/CN2021/077374, filed on Feb. 23, 2021, which claims priority to Chinese Patent Application No. 2020102771165, entitled "KEY GENERATION METHOD AND APPARATUS, DEVICE, AND MEDIUM" and filed with the China National Intellectual Property Administration on Apr. 9, 2020. The two applications are both incorporated herein by reference in their entirety.

FIELD OF THE TECHNOLOGY

This application relates to the field of Internet technologies, and specifically, to the field of communication computing technologies, and in particular, to a key generation technology based on a blockchain network.

BACKGROUND OF THE DISCLOSURE

With the development of Internet technologies, a digital signature technology based on a key pair is widely applied. The key pair may generally include a public key and a private key. The private key may be used for signing data to obtain signature information, and the public key may be used for verifying the signature information. At present, how to improve the reliability and security of the key pair has become a research hotspot.

SUMMARY

Embodiments of this application provide a key generation method and apparatus, a device, and a medium, which can effectively improve the reliability and security of a collaboration key pair.

In an aspect, an embodiment of this application provides a key generation method based on a blockchain network, performed by a first device, the method including transmitting a key negotiation request to a consensus node in a blockchain network, to request a key verification parameter; negotiating a collaboration key pair with a second device when the key verification parameter returned by the consensus node is received, to obtain a first private key component and a shared public key in the collaboration key pair, a second private key component in the collaboration key pair being held by the second device, and the shared public key being used for verifying validity of collaboration signature information obtained by collaboration signature using the first private key component and the second private key component; signing the key verification parameter by using the first private key component, to obtain a first signature component; generating transaction data according to the first signature component and the key verification parameter; transmitting the transaction data to the second device, the second device signing the transaction data by using the second private key component to obtain a second signature component, and obtaining the collaboration signature information according to the first signature component and the second signature component, and transmitting negotiation result data to the consensus node, the negotiation result data comprising the collaboration signature information, the shared public key, and the key verification parameter. The consensus node performs a consensus on the negotiation result data, and after the negotiation result data passes the consensus, submits the negotiation result data to a blockchain of the blockchain network.

Another aspect of this application provides a key generation method based on a blockchain network, performed by a second device, the method including: negotiating a collaboration key pair with a first device, to obtain a second private key component and a shared public key in the collaboration key pair, a first private key component in the collaboration key pair being held by the first device, and the shared public key being used for verifying validity of collaboration signature information obtained by collaboration signature using the first private key component and the second private key component; receiving transaction data transmitted by the first device, the transaction data being generated according to a first signature component and a key verification parameter, the first signature component being obtained by signing the key verification parameter by the first device using the first private key component, and the key verification parameter being returned by a consensus node in a blockchain network in response to a key negotiation request transmitted by the first device; signing the transaction data by using the second private key component to obtain a second signature component, and obtaining the collaboration signature information according to the first signature component and the second signature component; transmitting negotiation result data to the consensus node, the negotiation result data comprising the collaboration signature information, the shared public key, and the key verification parameter. The consensus node performs a consensus on the negotiation result data, and after the negotiation result data passes the consensus, submits the negotiation result data to a blockchain of the blockchain network.

Another aspect of this application provides a non-transitory computer storage medium, storing one or more instructions, the one or more instructions being suitable to be loaded by a processor to perform the key generation method performed by the first device; or, the computer storage medium storing one or more second instructions, the one or more second instructions being suitable to be loaded by a processor to perform the key generation method performed by the second device; or, the computer storage medium storing one or more third instructions, the one or more third instructions being suitable to be loaded by a processor to perform the key generation method performed by the consensus node.

Another aspect of this application provides a first device on a blockchain network, including a memory and a processor coupled to the memory. The processor is configured to perform: transmitting a key negotiation request to a consensus node in a blockchain network, to request a key verification parameter; negotiating a collaboration key pair with a second device when the key verification parameter returned by the consensus node is received, to obtain a first private key component and a shared public key in the collaboration key pair, a second private key component in the collaboration key pair being held by the second device, and the shared public key being used for verifying validity of collaboration signature information obtained by collaboration signature using the first private key component and the second private key component; signing the key verification parameter by using the first private key component, to obtain a first signature component; generating transaction data according to the first signature component and the key verification parameter; transmitting the transaction data to the second device, the second device signing the transaction data by using the second private key component to obtain a second signature component, and obtaining the collaboration signature information according to the first signature component and the second signature component, and transmitting negotiation result data to the consensus node, the negotiation result data comprising the collaboration signature information, the shared public key, and the key verification parameter. The consensus node performs a consensus on the negotiation result data, and after the negotiation result data passes the consensus, submits the negotiation result data to a blockchain of the blockchain network.

In the embodiments of this application, a first device may first transmit a key negotiation request to a consensus node in a blockchain network; and negotiate a collaboration key pair with a second device when a key verification parameter returned by the consensus node is received, to obtain a first private key component and a shared public key in the collaboration key pair, a second private key component in the collaboration key pair being held by the second device. In addition, the first device and the second device may perform collaboration signature on a key verification parameter respectively using the first private key component and the second private key component, to obtain a first signature component and a second signature component, and further obtain collaboration signature information according to the first signature component and the second signature component. Subsequently, the second device may transmit negotiation result data carrying the collaboration signature information, the shared public key, and the key verification parameter to the consensus node. The consensus node submits the negotiation result data to a blockchain of the blockchain network after determining that the negotiation result data passes a consensus. In the embodiments of this application, the first device and the second device each hold a private key component, and neither of the devices can hold a complete private key, so that the security of a collaboration key pair can be effectively improved. A negotiation process and a negotiation result of the collaboration key pair are chained by the key verification parameter issued by the consensus node in the blockchain network, which can ensure openness and transparency of the negotiation process, and can improve the reliability and security of the collaboration key pair.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes technical solutions in embodiments of this application with reference to the accompanying drawings in the embodiments of this application.

A blockchain network is a network formed by a point-to-point network (P2P network) and a blockchain, which includes a plurality of node devices (referred to as nodes). The node in the blockchain network specifically refers to a computer device that performs data processing, which may include, but is not limited to, a terminal device such as a smart terminal, a tablet computer, and a desktop computer, a service device (such as a data server, a cloud server), and the like. The same blockchain is stored inside each node in the blockchain network. The blockchain herein is a new application mode implemented by computer technologies based on distributed data storage, P2P transmission, a consensus mechanism, and an encryption algorithm, which is essentially a decentralized database.

Figure 1A:
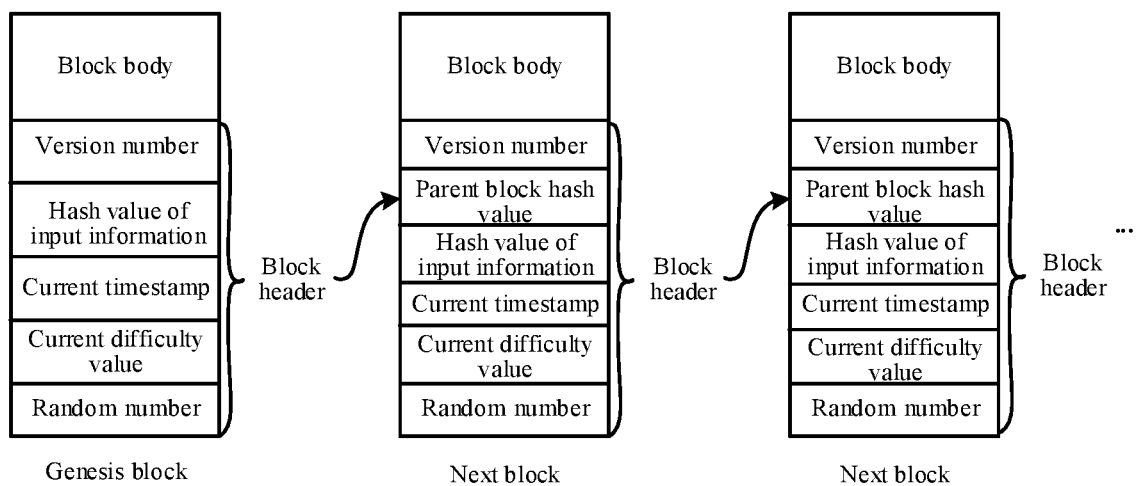
FIG. 1a is a schematic structural diagram of a blockchain according to an embodiment of this application.

Referring to FIG. 1a, a blockchain may be formed by a plurality of blocks. The block herein refers to a data structure used for recording input information. A genesis block (that is, a first block) includes a block header and a block body. The block header stores a hash value of the input information, a random number, a version number, a current timestamp, and a current difficulty value. The block body stores input information of the genesis block. The next block of the genesis block uses the genesis block as a parent block, and the next block also includes a block header and a block body. The block header stores a hash value of input information of a current block, a parent block hash value, a random number, a version number, a current timestamp, and a current difficulty value. The block body stores the input information of the current block. By analogy, block data stored in each block in the blockchain is related to block data stored in the parent block, to ensure the security of the input information in the block. The version number refers to version information of a related block protocol in a blockchain. The parent block hash value refers to a hash value of a block header of a previous block. The current timestamp refers to a system time when the block header is formed. The current difficulty value is a calculated difficulty value, which is a fixed value within a fixed time period, and is determined again after the fixed time period is exceeded.

It may be learned that the blockchain network can effectively ensure the security of data stored in the block. Based on this, the embodiments of this application provide a key generation system based on a blockchain network. Specifically, the key generation system may include at least a first device 11, a second device 12, and a consensus node 13 in a blockchain network. The first device 11 and the second device 12 may both be any one of the following: a terminal device such as a smart terminal (e.g., smartphone), a tablet computer, a desktop computer, laptop computer, a service device (such as a data server, a cloud server), and the like. The consensus node 13 is a node that can participate in consensus in the blockchain network. During specific implementation, the first device 11 may communicate with the second device 12 and the consensus node 13. Similarly, the second device 12 may communicate with the first device 11 and the consensus node 13.

It is to be understood that a specific architecture of the key generation system provided in the embodiments of this application may be physically deployed according to actual service requirements. In one embodiment, both the first device 11 and the second device 12 may be deployed outside the blockchain network. In this case, for a schematic architectural diagram of the key generation system, reference may be made to FIG. 1B. In one embodiment, the first device 11 may be deployed inside the blockchain network, and the second device 12 may be deployed outside the blockchain network. In this case, for a schematic architectural diagram of the key generation system, reference may be made to FIG. 1c. In one embodiment, the first device 11 may be deployed outside the blockchain network, and the second device 12 may be deployed inside the blockchain network. In this case, for a schematic architectural diagram of the key generation system, reference may be made to FIG. 1d.

Figure 1B:
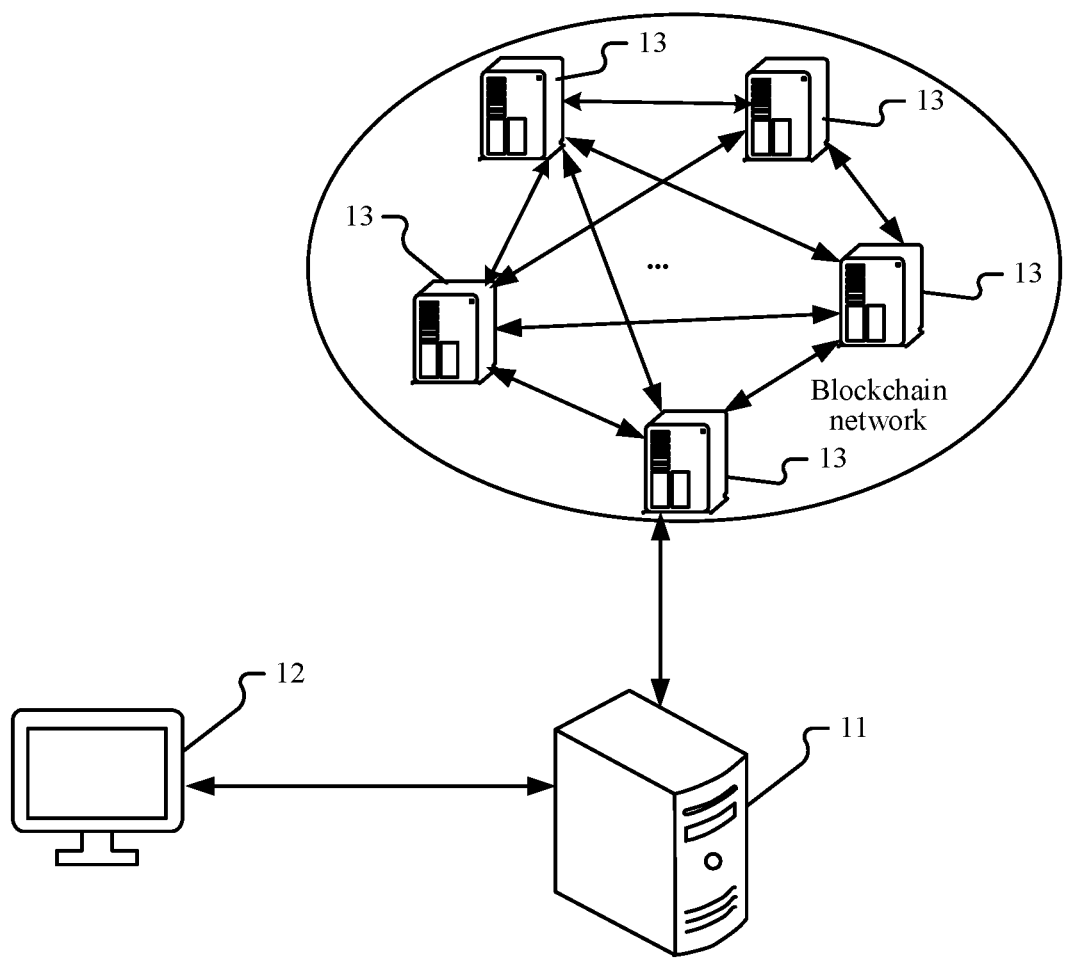
FIG. 1B is a schematic architectural diagram of a key generation system according to an embodiment of this application.
Figure 1C:
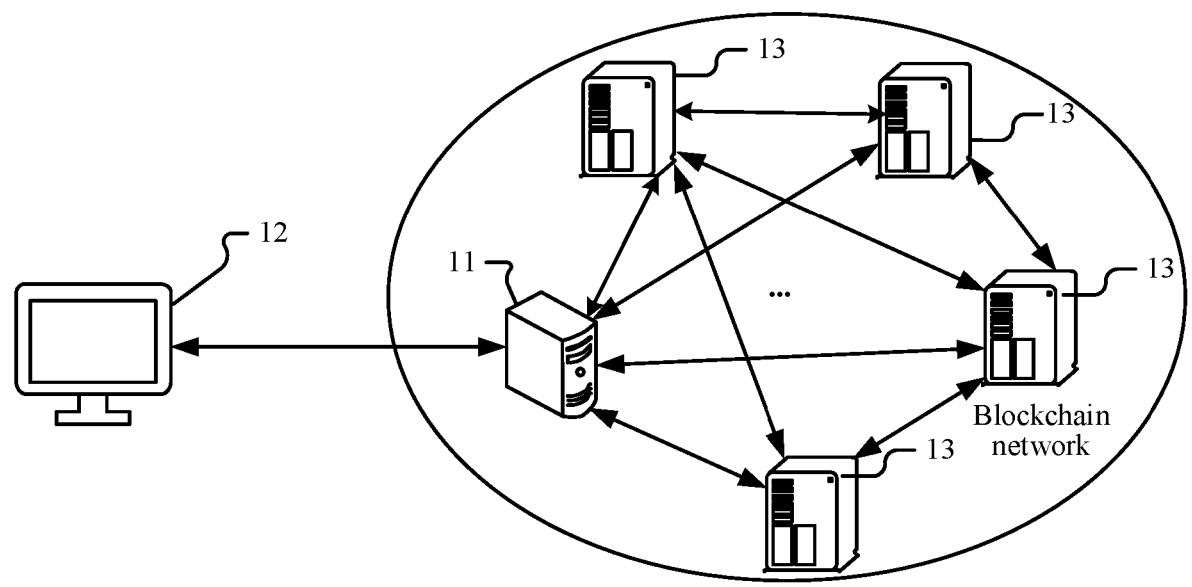
FIG. 1c is a schematic architectural diagram of a key generation system according to an embodiment of this application.
Figure 1D:
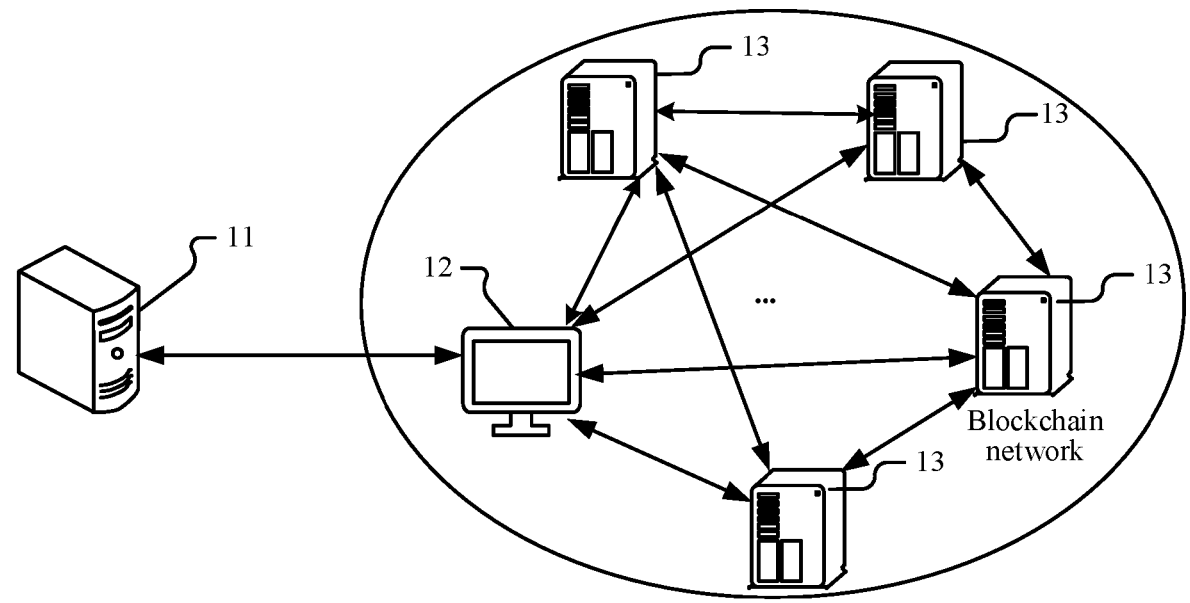
FIG. 1d is a schematic architectural diagram of a key generation system according to an embodiment of this application.

It is to be understood that the specific architecture of the key generation system provided in the embodiments of this application is not limited to those shown in FIG. 1B to FIG. 1d. For example, both the first device 11 and the second device 12 may further be deployed inside the blockchain network. In another example, in addition to including the consensus node 13, the blockchain network may further include other nodes (such as a simplified payment verification (SPV) node providing a storage service and a service node providing a service processing service).

Based on the key generation system, the embodiments of this application further provide a key generation solution. The key generation solution is mainly used for generating a collaboration key pair between a first device and a second device, so that the first device and the second device respectively hold part of private key components in the collaboration key pair, and subsequently, the first device and the second device can perform collaboration signature on the same data using respective held private key component. The so-called collaboration signature refers to a process in which two or more participants use respective held private key component to collaboratively complete signing of a piece of data.

A principle of the key generation solution is as follows: First, any party (such as the first device or the second device) that has a collaboration signature requirement submits a key negotiation request to a consensus node in a blockchain network, so that the consensus node generates a key verification parameter X for the party. Next, the first device and the second device negotiate a collaboration key pair, so that the first device holds a first private key component and a shared public key in the collaboration key pair, and the second device holds a second private key component and the shared public key in the collaboration key pair. Further, the first device and the second device perform collaboration signature on the key verification parameter X respectively using the first private key component and the second private key component, to obtain collaboration signature information. Subsequently, any party (such as the first device or the second device) may transmit the collaboration signature information, the shared public key, and the key verification parameter X together to the consensus node, to indicate that both the first device and the second device agree with a result of this key negotiation. Correspondingly, the consensus node may perform a consensus on data transmitted by any party, and add the data to a blockchain for storage after the consensus is verified.

In view of this, in the key generation solution provided in the embodiments of this application, the first device and the second device can each hold a private key component, and neither of the devices can hold a complete private key, so that the security of the collaboration key pair can be effectively ensured. A negotiation process and a negotiation result of the collaboration key pair are chained by the consensus node in the blockchain network by using a key verification parameter, which can ensure openness and transparency of the negotiation process, and improve the reliability and security of the collaboration key pair.

Figure 2:
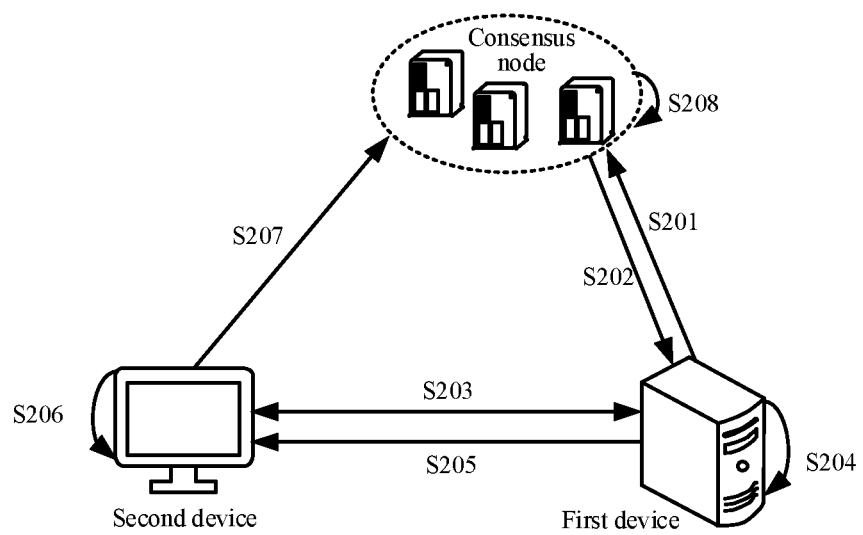
FIG. 2 is a schematic flowchart of a key generation method according to an embodiment of this application.

Based on the above description, an embodiment of this application provides a key generation method based on a blockchain network. Referring to FIG. 2, the key generation method may include the following steps S201 to S208:

S201. A first device transmits a key negotiation request to a consensus node in a blockchain network.

During specific implementation, if the first device and a second device intend to negotiate a collaboration key pair, the first device may first generate a key negotiation request. Subsequently, the first device may transmit the key negotiation request to the consensus node in the blockchain network, to request the consensus node to agree the first device and the second device to negotiate the collaboration key pair, and to return a key verification parameter. Correspondingly, after receiving the key negotiation request, if the consensus node agrees the first device and the second device to negotiate the collaboration key pair, a smart contract may be invoked to randomly generate a key verification parameter, and the key verification parameter may be returned to the first device by performing step S202.

S202. The consensus node returns the key verification parameter.

S203. The first device negotiates the collaboration key pair with the second device when receiving the key verification parameter returned by the consensus node, to obtain a first private key component and a shared public key in the collaboration key pair.

If receiving the key verification parameter returned by the consensus node, the first device may determine that the consensus node has agreed the first device and the second device to negotiate the collaboration key pair. In this case, the first device may negotiate the collaboration key pair with the second device, to obtain the first private key component and the shared public key in the collaboration key pair.

It is to be understood that the second device may alternatively negotiate the collaboration key pair with the first device, to obtain a second private key component and the shared public key in the collaboration key pair. That is, after the negotiation, the first private key component in the collaboration key pair is held by the first device, and the second private key component in the collaboration key pair is held by the second device. The shared public key in the collaboration key pair may be used for verifying validity of collaboration signature information obtained by collaboration signature using the first private key component and the second private key component.

In one embodiment, step S203 may include the following steps: First, the first device may obtain a random number agreed between the first device and the second device, the random number being generated by the first device or the second device using a random algorithm. In addition, the first device may generate the collaboration key pair according to the random number and by using a key algorithm, the collaboration key pair including a private key and a public key. Specifically, the first device may determine the random number as a key length, and generate a collaboration key pair with the key length by using the key algorithm (for example, an asymmetric encryption algorithm), that is, a length of the private key and a length of the public key in the collaboration key pair are both equal to the key length. Alternatively, the first device may directly determine the random number as the public key in the collaboration key pair, and calculate the private key corresponding to the public key by using the key algorithm. The public key and the private key form the collaboration key pair.

Subsequently, the first device may determine the public key in the collaboration key pair as the shared public key, and split the private key in the collaboration key pair into the first private key component and the second private key component, and the second private key component may be transmitted to the second device. That is, after the negotiation is completed, the first device may transmit the second private key component and the shared public key to the second device.

Correspondingly, in this implementation, a specific implementation that the second device negotiates the collaboration key pair with the first device, to obtain a second private key component and the shared public key in the collaboration key pair may be: receiving the second private key component and the shared public key transmitted by the first device, the shared public key being a public key in the collaboration key pair generated by the first device according to the random number and by using the key algorithm, and the second private key component being obtained by splitting the private key in the collaboration key pair by the first device.

In one embodiment, step S203 may include the following steps: First, a random number agreed between the first device and the second device is obtained, the random number being generated by the first device or the second device using a random algorithm. In addition, the first device may generate the first private key component and a first public key according to the random number and by using the key algorithm. Specifically, the first device may determine the random number as a key length, and generate the first private key component with the key length and the first public key with the key length by using the key algorithm, that is, a length of the first private key component and a length of the first public key are both equal to the key length. Subsequently, the first device may receive a second public key transmitted by the second device, and generate the shared public key according to the first public key and the second public key, the second public key being generated by the second device according to the random number and by using the key algorithm. Next, the first device may integrate the first public key and the second public key to obtain the shared public key. In some embodiments, the first device may further transmit the shared public key to the second device; or the first device may transmit the first public key to the second device, for the second device to integrate the first public key and the second public key to obtain the shared public key. In this embodiment, only the first device knows the first private key component and only the second device knows the second private key component, which can further improve the security and privacy of the private key component.

Correspondingly, in this implementation, a specific implementation that the second device negotiates the collaboration key pair with the first device, to obtain a second private key component and the shared public key in the collaboration key pair may be: obtaining a random number agreed between the first device and the second device; generating the second private key component and the second public key according to the random number and by using the key algorithm; transmitting the second public key to the first device, and generating the shared public key by the first device according to the first public key and the second public key, the first public key being generated by the first device according to the random number and by using the key algorithm; and receiving the shared public key returned by the first device. Alternatively, the second device may receive the first public key transmitted by the first device, and integrate the first public key and the second public key to obtain the shared public key.

S204. The first device signs the key verification parameter by using the first private key component, to obtain a first signature component; and generates transaction data according to the first signature component and the key verification parameter.

S205. The first device transmits the transaction data to the second device.

After the transaction data is obtained, the first device may transmit the transaction data to the second device, so that the second device signs the transaction data by using the second private key component to obtain a second signature component, obtains the collaboration signature information according to the first signature component and the second signature component, and transmits negotiation result data carrying the collaboration signature information, the shared public key, and the key verification parameter to the consensus node. The consensus node performs a consensus on the negotiation result data, and after the negotiation result data passes the consensus, submits the negotiation result data to a blockchain of the blockchain network.

The transaction data mentioned in this embodiment of this application is data for interaction between the first device and the second device, and is not commercialized data.

Correspondingly, after the second device receives the transaction data transmitted by the first device, steps S206 and S207 may be performed. The transaction data is generated according to the first signature component and the key verification parameter. The first signature component is obtained by signing the key verification parameter by the first device using the first private key component. The key verification parameter is returned by the consensus node to the first device after the first device transmits the key negotiation request to the consensus node in the blockchain network.

S206. The second device signs the transaction data by using the second private key component to obtain the second signature component, and obtains the collaboration signature information according to the first signature component and the second signature component.

S207. The second device transmits the negotiation result data carrying the collaboration signature information, the shared public key, and the key verification parameter to the consensus node.

In steps S206 and S207, the second device may first sign the transaction data by using the second private key component to obtain the second signature component. Specifically, the second device may directly sign the transaction data by using the second private key component to obtain the second signature component; or sign the key verification parameter in the transaction data by using the second private key component to obtain the second signature component.

In addition, the second device may integrate the first signature component and the second signature component to obtain the collaboration signature information, generate the negotiation result data according to the collaboration signature information, the shared public key, and the key verification parameter, and transmit the negotiation result data to the consensus node. The consensus node performs a consensus on the negotiation result data, and after the negotiation result data passes the consensus, submits the negotiation result data to the blockchain of the blockchain network.

Correspondingly, the consensus node may receive the negotiation result data transmitted by the second device, the negotiation result data carrying the collaboration signature information, the shared public key, and the key verification parameter. Subsequently, the consensus node may perform the following step S208 on the negotiation result data: performing a consensus on the negotiation result data; and submitting the negotiation result data to the blockchain of the blockchain network when the consensus is verified.

It is to be understood that after obtaining the collaboration signature information, the second device may return the collaboration signature information to the first device, and the first device transmits the negotiation result data carrying the collaboration signature information, the shared public key, and the key verification parameter to the consensus node.

In this embodiment of this application, the first device may first transmit the key negotiation request to the consensus node in the blockchain network; and negotiate the collaboration key pair with the second device when the key verification parameter returned by the consensus node is received, to obtain the first private key component and the shared public key in the collaboration key pair, the second private key component in the collaboration key pair being held by the second device. In addition, the first device and the second device perform collaboration signature on the key verification parameter respectively using the first private key component and the second private key component, to obtain the first signature component and the second signature component, and further obtain the collaboration signature information according to the first signature component and the second signature component. Subsequently, the second device may transmit the negotiation result data carrying the collaboration signature information, the shared public key, and the key verification parameter to the consensus node. The consensus node submits the negotiation result data to the blockchain of the blockchain network after determining that the negotiation result data passes a consensus. In this embodiment of this application, the first device and the second device each hold a private key component, and neither of the devices can hold a complete private key, so that the security of the collaboration key pair can be effectively improved. A negotiation process and a negotiation result of the collaboration key pair are chained by the key verification parameter issued by the consensus node in the blockchain network, which can ensure openness and transparency of the negotiation process, and can improve the reliability and security of the collaboration key pair.

Figure 3:
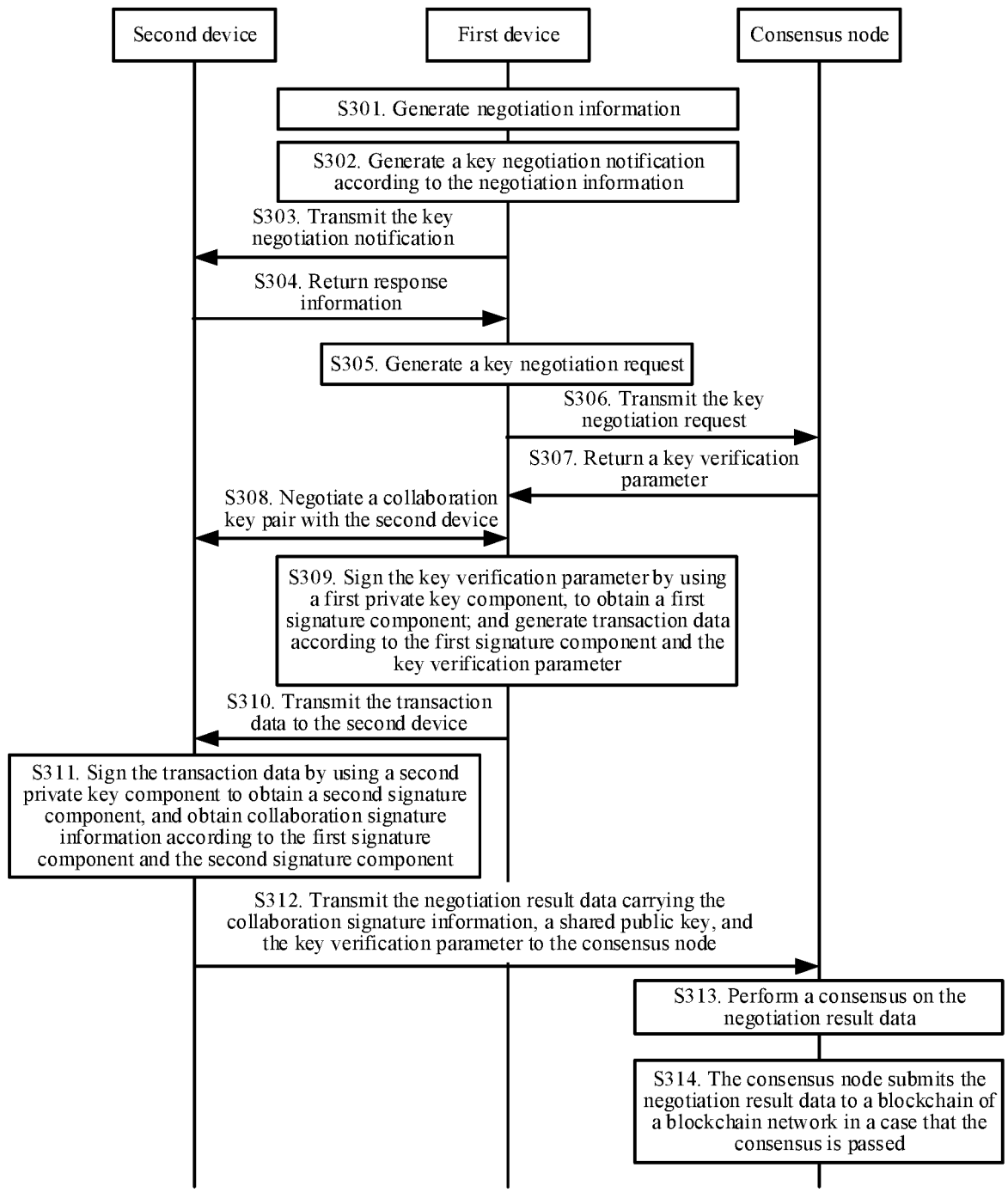
FIG. 3 is a schematic flowchart of a key generation method according to an embodiment of this application.

FIG. 3 is a schematic flowchart of a key generation method based on a blockchain network according to an embodiment of this application. Referring to FIG. 3, the key generation method may include the following steps S301 to S314:

S301. A first device generates negotiation information.

S302. The first device generates a key negotiation notification according to the negotiation information.

S303. The first device transmits the key negotiation notification to a second device.

In steps S301 to S303, if the first device and the second device intend to negotiate a collaboration key pair, the first device may first generate the negotiation information, and the negotiation information may be used for instructing the first device to request to negotiate the collaboration key pair with the second device. Subsequently, the key negotiation notification is generated according to the negotiation information, and the key negotiation notification is transmitted to the second device.

During specific implementation, a specific implementation of generating the key negotiation notification according to the negotiation information may be: directly identifying the negotiation information as the key negotiation notification.

During specific implementation, a specific implementation of generating the key negotiation notification according to the negotiation information may be: signing the negotiation information by using a system private key of the first device, to obtain a system digital signature of the first device, where the system private key of the first device may be randomly generated by the first device using a key algorithm, and generating the key negotiation notification by using the negotiation information and the system digital signature of the first device. That is, in this implementation, the key negotiation notification may carry the negotiation information and the system digital signature of the first device obtained by signing the negotiation information using the system private key of the first device. The system digital signature of the first device is added to the key negotiation notification, so that the second device may perform identity verification on the first device according to the system digital signature of the first device, thereby improving the security and reliability.

Correspondingly, the second device may receive the key negotiation notification of the first device, the key negotiation notification being generated according to the negotiation information, and the second device may determine whether to negotiate the collaboration key pair with the first device. If the second device agrees to negotiate the collaboration key pair with the first device, the second device may perform step S304. If the second device does not agree to negotiate the collaboration key pair with the first device, the second device may return a rejection notification to the first device, and end this process. The rejection notification is used for indicating that the second device does not agree to negotiate the collaboration key pair with the first device.

S304. The second device returns response information to the first device when it is agreed to negotiate the collaboration key pair with the first device.

During specific implementation, if the second device agrees to negotiate the collaboration key pair with the first device, the second device may directly return the response information to the first device. That is, the response information may be directly transmitted after the second device agrees to negotiate the collaboration key pair with the first device.

During specific implementation, if the key negotiation notification carries the negotiation information and the system digital signature of the first device obtained by signing the negotiation information using the system private key of the first device, the second device may first perform identity verification on the first device according to the system digital signature of the first device, and transmit the response information to the first device after the identity verification on the first device succeeds. Specifically, if it is agreed to negotiate the collaboration key pair with the first device, the second device may first obtain a system public key of the first device, and verify the system digital signature of the first device by using the system public key of the first device. If the verification succeeds, it may be determined that the identity verification on the first device succeeds. In this case, the response information may be transmitted to the first device.

Further, if the verification succeeds, the second device may further sign the key negotiation notification by using a system private key of the second device, to obtain a system digital signature of the second device; and generate the response information according to the key negotiation notification and the system digital signature of the second device, and transmit the response information to the first device. The response information may also be transmitted after the second device agrees to negotiate the collaboration key pair with the first device and the system digital signature of the first device is successfully verified by using the system public key of the first device.

S305. The first device generates a key negotiation request when receiving the response information returned by the second device.

During specific implementation, if receiving the response information returned by the second device, the first device may determine that the second device agrees to negotiate the collaboration key pair with the first device. In this case, the key negotiation request may be directly generated.

During specific implementation, if the response information carries the system digital signature of the second device obtained by signing the key negotiation notification using the system private key of the second device, a specific implementation of step S305 may be: obtaining the system public key of the second device when the first device receives the response information returned by the second device, and verifying the system digital signature of the second device by using the system public key of the second device; and generating, when the system digital signature of the second device is successfully verified, the key negotiation request by using the system digital signature of the first device, the system digital signature of the second device, and the negotiation information.

S306. The first device transmits the key negotiation request to a consensus node.

S307. The consensus node returns a key verification parameter to the first device.

In steps S306 and S307, the key negotiation request is used for requesting the consensus node to agree the first device and the second device to negotiate the collaboration key pair, and to return the key verification parameter. Therefore, after receiving the key negotiation request transmitted by the first device, the consensus node may invoke a smart contract to generate a key verification parameter, and return the key verification parameter to the first device, so that the first device negotiates the collaboration key pair with the second device, to obtain a first private key component, a second private key component, and a shared public key, and the first device and the second device sign the key verification parameter respectively by using the first private key component and the second private key component, to obtain a first signature component and a second signature component, and further obtain collaboration signature information according to the first signature component and the second signature component.

S308. The first device negotiates the collaboration key pair with the second device when receiving the key verification parameter returned by the consensus node, to obtain the first private key component and the shared public key in the collaboration key pair. Correspondingly, the second device may alternatively negotiate the collaboration key pair with the first device, to obtain the second private key component and the shared public key in the collaboration key pair.

S309. The first device signs the key verification parameter by using the first private key component, to obtain the first signature component; and generates transaction data according to the first signature component and the key verification parameter.

S310. The first device transmits the transaction data to the second device.

Correspondingly, the second device may receive the transaction data transmitted by the first device.

S311. The second device signs the transaction data by using the second private key component to obtain the second signature component, and obtains the collaboration signature information according to the first signature component and the second signature component.

S312. The second device transmits the negotiation result data carrying the collaboration signature information, the shared public key, and the key verification parameter to the consensus node. Correspondingly, the consensus node may receive the negotiation result data transmitted by the second device, and steps S313 and S314 are performed.

S313. The consensus node performs a consensus on the negotiation result data.

During specific implementation, the consensus node may first parse the negotiation result data, to obtain the collaboration signature information, the shared public key, and the key verification parameter. Subsequently, the consensus node may verify validity of the collaboration signature information by using the shared public key. If the verification succeeds, it is determined that the negotiation result data passes the consensus; and otherwise, it is determined that the negotiation result data does not pass the consensus.

It is to be understood that if a blockchain network includes only one consensus node, the consensus node can directly determine, after determining that validity verification is performed on the collaboration signature information, that the negotiation result data passes the consensus. If the blockchain network includes a plurality of consensus nodes, the plurality of consensus nodes can vote on, according to verification results of the plurality of consensus nodes on validity of the collaboration signature information, whether the negotiation result data passes the consensus. Subsequently, whether the negotiation result data passes the consensus is finally determined according to vote results (for example, "support the collaboration signature information to success in verification" or "oppose the collaboration signature information to success in verification") of the consensus nodes. If vote results of most of the consensus nodes (for example, ⅔ consensus nodes) are "support the collaboration signature information to success in verification", it may be determined that the negotiation result data passes the consensus.

S314. The consensus node submits the negotiation result data to a blockchain of the blockchain network when the consensus is verified.

Figure 4A:
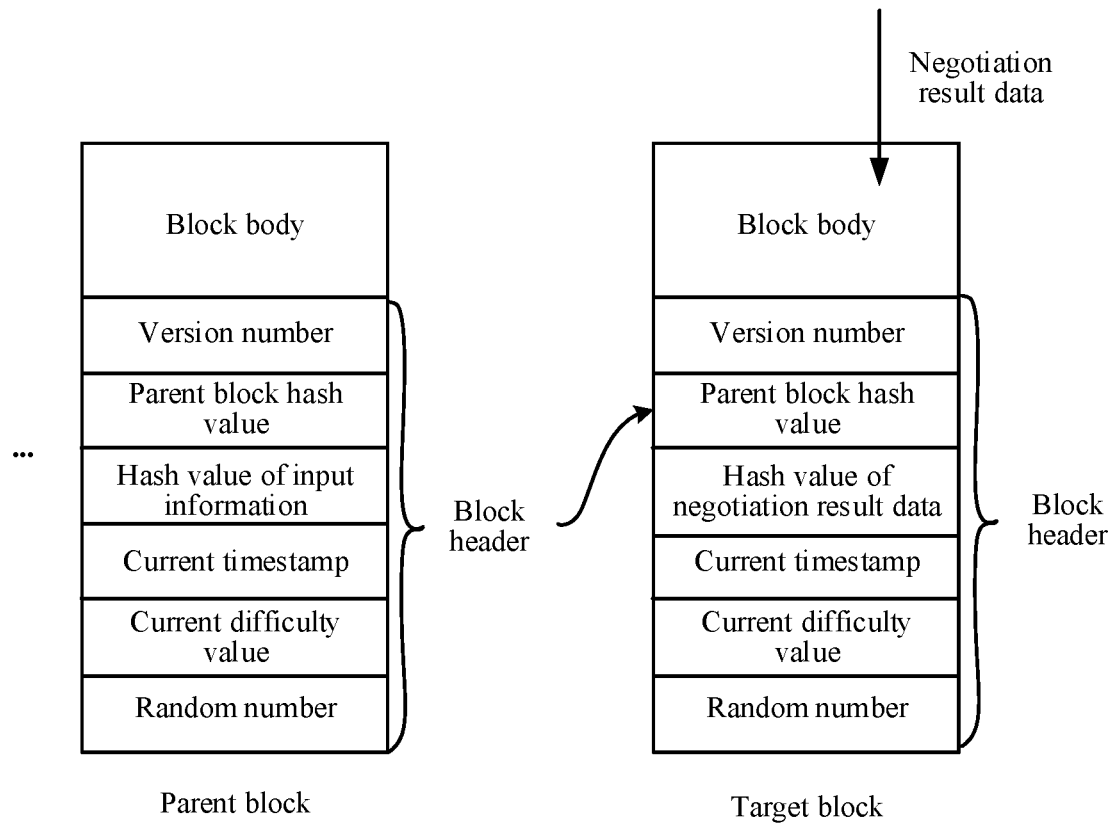
FIG. 4a is a schematic diagram of packaging negotiation result data into a target block according to an embodiment of this application.

During specific implementation, if the negotiation result data passes the consensus, the negotiation result data may be first packaged into a target block. A specific process of packaging the negotiation result data into a target block is as follows: The consensus node may add the negotiation result data to a block body of the target block, as shown in FIG. 4a. In some embodiments, the consensus node may further sign the negotiation result data, and add signature information of the negotiation result data and the negotiation result data together to the block body of the target block.

In addition, the consensus node may perform a hash operation on the negotiation result data in the block body by using a Merkle tree algorithm, to obtain a hash value of the negotiation result data. Subsequently, the consensus node may generate a random number by using a random algorithm, and form a block header of the target block by using the hash value of the negotiation result data obtained through calculation, the random number, a version number, a parent block hash value, a current timestamp, and a current difficulty value.

Figure 4B:
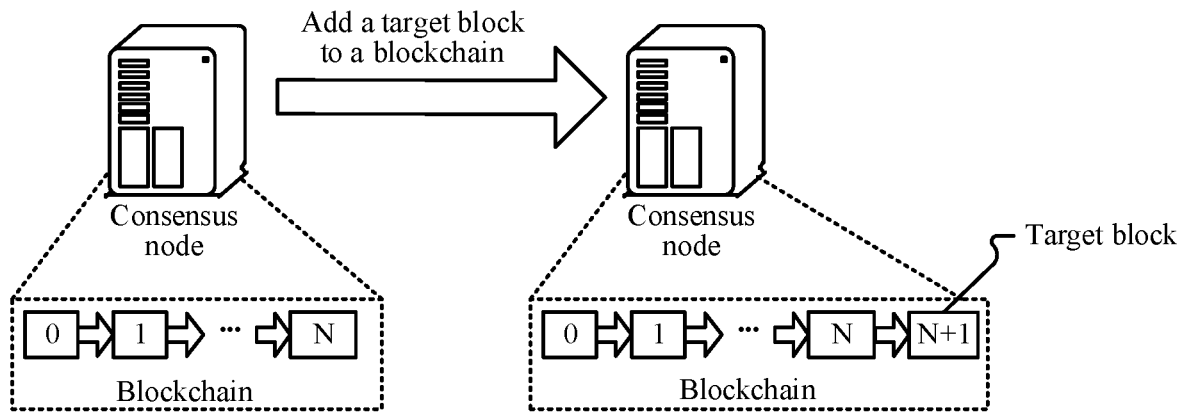
FIG. 4b is a schematic flowchart of adding a target block to a blockchain according to an embodiment of this application.

In addition, a plurality of times of hash operations may be performed on content included in the block header by using a feature value algorithm (such as a SHA256 algorithm), to obtain a hash value of the block header of the target block. A quantity of times of hash operations herein may be determined according to a calculating difficulty. The calculation with a higher difficulty indicates that the quantity of times of hash operations is larger. If the hash value of the block header of the target block is less than a preset threshold, it indicates that the block header of the target block is valid. In this case, a valid target block can be obtained. If the hash value of the block header of the target block is not less than the preset threshold, it indicates that the block header of the target block is invalid. In this case, a step of "generating a random number by using a random algorithm" needs to be jumped to, until a valid block header is generated. As shown in FIG. 4b, after the target block is obtained, the consensus node may add the target block to the blockchain of the blockchain network.

In this embodiment of this application, the first device may first transmit the key negotiation request to the consensus node in the blockchain network; and negotiate the collaboration key pair with the second device when the key verification parameter returned by the consensus node is received, to obtain the first private key component and the shared public key in the collaboration key pair, the second private key component in the collaboration key pair being held by the second device. In addition, the first device and the second device perform collaboration signature on the key verification parameter respectively using the first private key component and the second private key component, to obtain the first signature component and the second signature component, and further obtain the collaboration signature information according to the first signature component and the second signature component. Subsequently, the second device may transmit the negotiation result data carrying the collaboration signature information, the shared public key, and the key verification parameter to the consensus node. The consensus node submits the negotiation result data to the blockchain of the blockchain network after determining that the negotiation result data passes a consensus. In this embodiment of this application, the first device and the second device each hold a private key component, and neither of the devices can hold a complete private key, so that the security of the collaboration key pair can be effectively improved. A negotiation process and a negotiation result of the collaboration key pair are chained by the key verification parameter issued by the consensus node in the blockchain network, which can ensure openness and transparency of the negotiation process, and can improve the reliability and security of the collaboration key pair.

Figure 5:
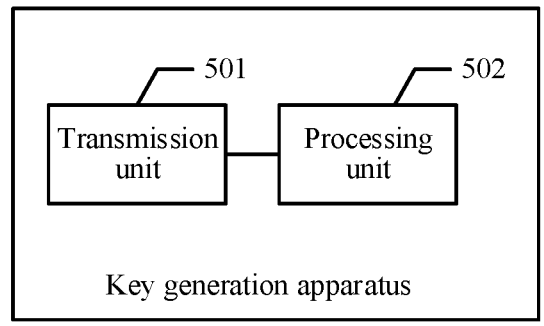
FIG. 5 is a schematic structural diagram of a key generation apparatus according to an embodiment of this application.

Based on the descriptions of the foregoing method embodiments, an embodiment of this application further discloses a key generation apparatus. The key generation apparatus may be a computer program (including program code) running on a first device, and the key generation apparatus may perform some of the method steps shown in FIG. 2 and FIG. 3. Referring to FIG. 5, the key generation apparatus may operate the following units:

a transmission unit 501, configured to transmit a key negotiation request to a consensus node in a blockchain network, to request the consensus node to return a key verification parameter; and a processing unit 502, configured to negotiate a collaboration key pair with a second device when the key verification parameter returned by the consensus node is received, to obtain a first private key component and a shared public key in the collaboration key pair, a second private key component in the collaboration key pair being held by the second device, and the shared public key being used for verifying validity of collaboration signature information obtained by collaboration signature using the first private key component and the second private key component;

the processing unit 502, being further configured to sign the key verification parameter by using the first private key component, to obtain a first signature component; and generate transaction data according to the first signature component and the key verification parameter;

the transmission unit 501, being further configured to transmit the transaction data to the second device, so that the second device signs the transaction data by using the second private key component to obtain a second signature component, and obtains the collaboration signature information according to the first signature component and the second signature component, and transmits negotiation result data to the consensus node, the negotiation result data including the collaboration signature information, the shared public key, and the key verification parameter; and perform a consensus on the negotiation result data by the consensus node, and after the negotiation result data passes the consensus, submit the negotiation result data to a blockchain of the blockchain network.

In one embodiment, when being configured to negotiate a collaboration key pair with a second device, to obtain a first private key component and a shared public key in the collaboration key pair, the processing unit 502 is further configured to: obtain a random number agreed between the first device and the second device, the random number being generated by the first device or the second device using a random algorithm; generate the collaboration key pair according to the random number and by using a key algorithm, the collaboration key pair including a private key and a public key; and identify the public key in the collaboration key pair as the shared public key, and split the private key in the collaboration key pair into the first private key component and the second private key component, the second private key component being transmitted to the second device.

In one embodiment, when being configured to negotiate a collaboration key pair with a second device, to obtain a first private key component and a shared public key in the collaboration key pair, the processing unit 502 may be further configured to: obtain a random number agreed between the first device and the second device, the random number being generated by the first device or the second device using a random algorithm; generate the first private key component and a first public key according to the random number and by using a key algorithm; and receive a second public key transmitted by the second device, and generate the shared public key according to the first public key and the second public key, the second public key being generated by the second device according to the random number and by using the key algorithm.

In one embodiment, the processing unit 502 is configured to: generate negotiation information, the negotiation information being used for instructing the first device to request to negotiate the collaboration key pair with the second device; and generate a key negotiation notification according to the negotiation information.

The transmission unit 501 may be further configured to: transmit the key negotiation notification to the second device.

The processing unit 502 may be further configured to: generate the key negotiation request when response information returned by the second device for the key negotiation notification is received.

In one embodiment, when being configured to generate a key negotiation notification according to the negotiation information, the processing unit 502 is further configured to: sign the negotiation information by using a system private key of the first device, to obtain a system digital signature of the first device; and generate the key negotiation notification by using the negotiation information and the system digital signature of the first device, the response information being transmitted after the second device agrees to negotiate the collaboration key pair with the first device and the system digital signature of the first device is successfully verified by using the system public key of the first device.

In one embodiment, the response information carries a system digital signature of the second device obtained by signing the key negotiation notification using a system private key of the second device. Correspondingly, when being configured to generate the key negotiation request when response information returned by the second device for the key negotiation notification is received, the processing unit 502 is further configured to: obtain a system public key of the second device when the response information returned by the second device for the key negotiation notification is received, and verify a system digital signature of the second device by using a system public key of the second device; and generate, when the system digital signature of the second device is successfully verified, the key negotiation request by using the system digital signature of the first device, the system digital signature of the second device, and the negotiation information.

According to an embodiment of this application, some of the steps in the method shown in FIG. 2 or FIG. 3 may be performed by the units of the key generation apparatus shown in FIG. 5. For example, steps S201 and S205 shown in FIG. 2 may be performed by the transmission unit 501 shown in FIG. 5, and steps S203 and S204 may be performed by the processing unit 502 shown in FIG. 5. In another example, steps S301, S302, and S305, steps S308 and S309 shown in FIG. 3 may all be performed by the processing unit 502 shown in FIG. 5, and steps S303, S306, and S310 may be performed by the transmission unit 501 shown in FIG. 5.

According to another embodiment of this application, the units of the key generation apparatus shown in FIG. 5 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the key generation apparatus may also include other units. In an actual application, the functions may also be cooperatively implemented by other units and may be cooperatively implemented by a plurality of units.

According to another embodiment of this application, a computer program (including program code) that can perform some of the steps in the corresponding methods shown in FIG. 2 or FIG. 3 may be run on a general-purpose computing device, such as a computer, which include processing elements and storage elements such as a central processing unit (CPU), a random access memory (RAM), and a read-only memory (ROM). The cooperation of the processing element and the storage element can implement the key generation method in the embodiments of this application. The computer program may be recorded on, for example, a computer-readable recording medium, and may be loaded into the foregoing general-purpose computing device by using the computer-readable recording medium and run on the computing device.

Figure 6:
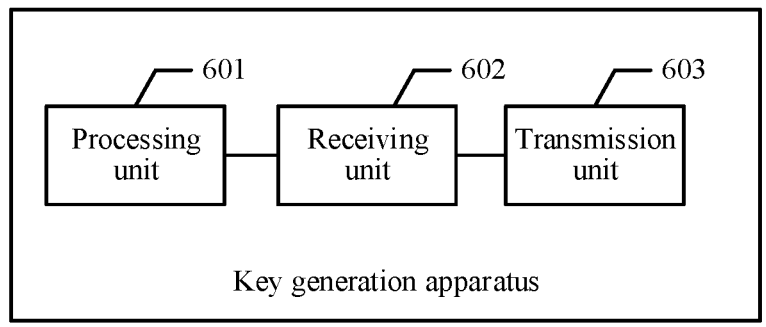
FIG. 6 is a schematic structural diagram of a key generation apparatus according to an embodiment of this application.

Based on the descriptions of the foregoing method embodiments, an embodiment of this application further discloses a key generation apparatus. The key generation apparatus may be a computer program (including program code) running on a second device, and the key generation apparatus may perform some of the method steps shown in FIG. 2 and FIG. 3. Referring to FIG. 6, the key generation apparatus may operate the following units:

a processing unit 601, configured to negotiate a collaboration key pair with a first device, to obtain a second private key component and a shared public key in the collaboration key pair, a first private key component in the collaboration key pair being held by the first device, and the shared public key being used for verifying validity of collaboration signature information obtained by collaboration signature using the first private key component and the second private key component;

a receiving unit 602, configured to receive transaction data transmitted by the first device, the transaction data being generated according to a first signature component and a key verification parameter, the first signature component being obtained by signing the key verification parameter by the first device using the first private key component, and the key verification parameter being returned by a consensus node in a blockchain network in response to a key negotiation request transmitted by the first device;

the processing unit 601, being further configured to sign the transaction data by using the second private key component to obtain a second signature component, and obtain the collaboration signature information according to the first signature component and the second signature component; and a transmission unit 603, configured to transmit negotiation result data to the consensus node, the negotiation result data including the collaboration signature information, the shared public key, and the key verification parameter; and perform a consensus on the negotiation result data by the consensus node, and after the negotiation result data passes the consensus, submit the negotiation result data to a blockchain of the blockchain network.

In one embodiment, when being configured to negotiate a collaboration key pair with a first device, to obtain a second private key component and a shared public key in the collaboration key pair, the processing unit 601 may be further configured to: receive the second private key component and the shared public key transmitted by the first device, the shared public key being a public key in the collaboration key pair generated by the first device according to a random number and by using a key algorithm, the second private key component being obtained by splitting a private key in the collaboration key pair by the first device, and the random number being agreed between the first device and the second device, and the random number being generated by the first device or the second device using a random algorithm.

In one embodiment, when being configured to negotiate a collaboration key pair with a first device, to obtain a second private key component and a shared public key in the collaboration key pair, the processing unit 601 may be further configured to: obtain a random number agreed between the first device and the second device, the random number being generated by the first device or the second device using a random algorithm; generate the second private key component and a second public key according to the random number and by using a key algorithm; transmit the second public key to the first device, and generate the shared public key by the first device according to a first public key and the second public key, the first public key being generated by the first device according to the random number and by using the key algorithm; and receive the shared public key returned by the first device.

In one embodiment, the receiving unit 602 may be further configured to: receive a key negotiation notification transmitted by the first device, the key negotiation notification being generated according to negotiation information, and the negotiation information being used for instructing the first device to request to negotiate the collaboration key pair with the second device.

The transmission unit 603 may be further configured to: return response information to the first device when it is agreed to negotiate the collaboration key pair with the first device.

In one embodiment, the key negotiation notification includes the negotiation information and a system digital signature of the first device obtained by signing the negotiation information using a system private key of the first device. Correspondingly, when being configured to return response information to the first device when it is agreed to negotiate the collaboration key pair with the first device, the transmission unit 603 may be further configured to: verify the system digital signature of the first device by using a system public key of the first device when it is agreed to negotiate the collaboration key pair with the first device; and transmit the response information to the first device when the verification succeeds.

In one embodiment, when being configured to transmit the response information to the first device when the verification succeeds, the transmission unit 603 may be further configured to: sign the key negotiation notification by using a system private key of the second device when the verification succeeds, to obtain a system digital signature of the second device; generate the response information according to the key negotiation notification and the system digital signature of the second device; and transmit the response information to the first device.

According to an embodiment of this application, some of the steps in the method shown in FIG. 2 or FIG. 3 may be performed by the units of the key generation apparatus shown in FIG. 6. For example, step S206 shown in FIG. 2 may be performed by the processing unit 601 shown in FIG. 6, and step S207 may be performed by the transmission unit 603 shown in FIG. 6. In another example, steps S308 and S311 shown in FIG. 3 may be performed by the processing unit 601 shown in FIG. 6, and steps S304 and S312 may be performed by the transmission unit 603 shown in FIG. 6.

According to another embodiment of this application, the units of the key generation apparatus shown in FIG. 6 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the key generation apparatus may also include other units. In an actual application, the functions may also be cooperatively implemented by other units and may be cooperatively implemented by a plurality of units.

According to another embodiment of this application, a computer program (including program code) that can perform some of the steps in the corresponding methods shown in FIG. 2 or FIG. 3 may be run on a general-purpose computing device, such as a computer, which include processing elements and storage elements such as a CPU, a RAM, and ROM. The cooperation of the processing element and the storage element can implement the key generation method in the embodiments of this application. The computer program may be recorded on, for example, a computer-readable recording medium, and may be loaded into the foregoing general-purpose computing device by using the computer-readable recording medium and run on the computing device.

Figure 7:
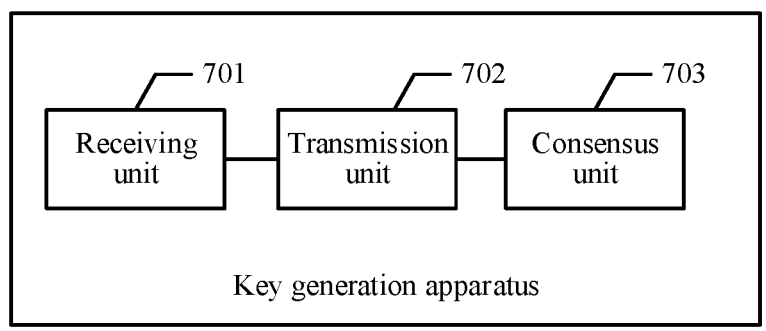
FIG. 7 is a schematic structural diagram of a key generation apparatus according to an embodiment of this application.

Based on the descriptions of the foregoing method embodiments, an embodiment of this application further discloses a key generation apparatus. The key generation apparatus may be a computer program (including program code) running on a consensus node of a blockchain network, and the key generation apparatus may perform some of the method steps shown in FIG. 2 and FIG. 3. Referring to FIG. 7, the key generation apparatus may operate the following units:

a receiving unit 701, configured to receive a key negotiation request transmitted by a first device, the key negotiation request being used for requesting to return a key verification parameter;

a transmission unit 702, configured to return the key verification parameter to the first device, so that the first device negotiates a collaboration key pair with a second device, to obtain a first private key component, a second private key component, and a shared public key; and the first device and the second device perform collaboration signature on the key verification parameter respectively using the first private key component and the second private key component, to obtain collaboration signature information;

the receiving unit 701, being further configured to receive negotiation result data transmitted by the second device, the negotiation result data carrying the collaboration signature information, the shared public key, and the key verification parameter; and a consensus unit 703, configured to perform a consensus on the negotiation result data; and submit the negotiation result data to a blockchain of a blockchain network when the consensus is verified.

According to an embodiment of this application, some of the steps in the method shown in FIG. 2 or FIG. 3 may be performed by the units of the key generation apparatus shown in FIG. 7. For example, step S202 shown in FIG. 2 may be performed by the transmission unit 702 shown in FIG. 7, and step S208 may be performed by the consensus unit 703 shown in FIG. 7. In another example, step S307 shown in FIG. 3 may be performed by the transmission unit 702 shown in FIG. 7, and steps S313 and S314 may be performed by the consensus unit 703 shown in FIG. 7.

According to another embodiment of this application, the units of the key generation apparatus shown in FIG. 7 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the key generation apparatus may also include other units. In an actual application, the functions may also be cooperatively implemented by other units and may be cooperatively implemented by a plurality of units.

According to another embodiment of this application, a computer program (including program code) that can perform some of the steps in the corresponding methods shown in FIG. 2 or FIG. 3 may be run on a general-purpose computing device, such as a computer, which include processing elements and storage elements such as a CPU, a RAM, and ROM. The cooperation of the processing element and the storage element can implement the key generation method in the embodiments of this application. The computer program may be recorded on, for example, a computer-readable recording medium, and may be loaded into the foregoing general-purpose computing device by using the computer-readable recording medium and run on the computing device.

In the embodiments of this application, the first device and the second device each hold a private key component, and neither of the devices can hold a complete private key, so that the security of a collaboration key pair can be effectively improved. A negotiation process and a negotiation result of the collaboration key pair are chained by the key verification parameter issued by the consensus node in the blockchain network, which can ensure openness and transparency of the negotiation process, and can improve the reliability and security of the collaboration key pair.

Figure 8:
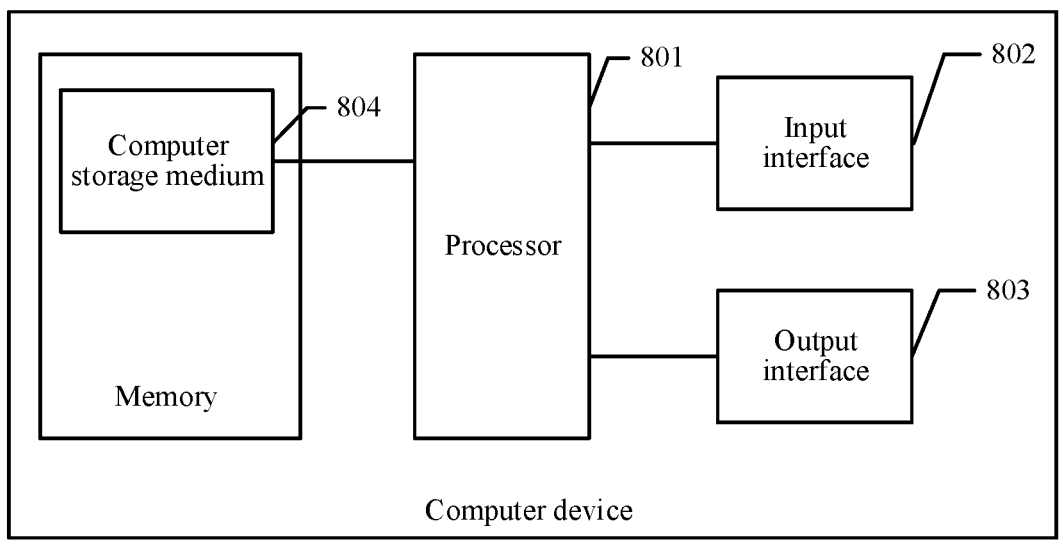
FIG. 8 is a schematic structural diagram of a computer device according to an embodiment of this application.

Based on the descriptions of the foregoing method embodiments and apparatus embodiments, an embodiment of this application further provides a computer device. The computer device may be the first device, the second device, or the consensus node described above. Referring to FIG. 8, the computer device includes at least a processor 801, an input interface 802, an output interface 803, and a computer storage medium 804. The processor 801, the input interface 802, the output interface 803, and the computer storage medium 804 in the computer device may be connected by using a bus or in another manner. The computer storage medium 804 may be stored in a memory of the computer device. The computer storage medium 804 is configured to store a computer program. The computer program includes program instructions. The processor 201 is configured to execute the program instructions stored in the computer storage medium 804. The processor 801 (or referred to as a CPU) is a computing core and a control core of the computer device, is suitable for implementing one or more instructions, and is specifically suitable for loading and executing one or more instructions to implement a corresponding method procedure or a corresponding function.

In an embodiment, if the computer device is the first device, the processor 801 described in this embodiment of this application may be configured to perform the key generation method of a side of the first device, including: transmitting a key negotiation request to a consensus node in a blockchain network, to request the consensus node to return a key verification parameter; negotiating a collaboration key pair with a second device when the key verification parameter returned by the consensus node is received, to obtain a first private key component and a shared public key in the collaboration key pair, a second private key component in the collaboration key pair being held by the second device, and the shared public key being used for verifying validity of collaboration signature information obtained by collaboration signature using the first private key component and the second private key component; signing the key verification parameter by using the first private key component, to obtain a first signature component; generating transaction data according to the first signature component and the key verification parameter; transmitting the transaction data to the second device, so that the second device signs the transaction data by using the second private key component to obtain a second signature component, and obtains the collaboration signature information according to the first signature component and the second signature component, and transmits negotiation result data to the consensus node, the negotiation result data including the collaboration signature information, the shared public key, and the key verification parameter; and performing a consensus on the negotiation result data by the consensus node, and after the negotiation result data passes the consensus, submitting the negotiation result data to a blockchain of the blockchain network.

In an embodiment, if the computer device is the second device, the processor 801 described in this embodiment of this application may be configured to perform the key generation method of a side of the second device, including: negotiating a collaboration key pair with a first device, to obtain a second private key component and a shared public key in the collaboration key pair, a first private key component in the collaboration key pair being held by the first device, and the shared public key being used for verifying validity of collaboration signature information obtained by collaboration signature using the first private key component and the second private key component; receiving transaction data transmitted by the first device, the transaction data being generated according to a first signature component and a key verification parameter, the first signature component being obtained by signing the key verification parameter by the first device using the first private key component, and the key verification parameter being returned by a consensus node in a blockchain network in response to a key negotiation request transmitted by the first device; signing the transaction data by using the second private key component to obtain a second signature component, and obtaining the collaboration signature information according to the first signature component and the second signature component; transmitting negotiation result data to the consensus node, the negotiation result data including the collaboration signature information, the shared public key, and the key verification parameter; and performing a consensus on the negotiation result data by the consensus node, and after the negotiation result data passes the consensus, submitting the negotiation result data to a blockchain of the blockchain network.

In an embodiment, if the computer device is the consensus node in a blockchain network, the processor 801 described in this embodiment of this application may be configured to perform the key generation method of a side of the consensus node, including: receiving a key negotiation request transmitted by a first device, the key negotiation request being used for requesting the consensus node to return a key verification parameter; returning the key verification parameter to the first device, so that the first device negotiates a collaboration key pair with a second device, to obtain a first private key component, a second private key component, and a shared public key, and the first device and the second device perform collaboration signature on the key verification parameter respectively using the first private key component and the second private key component, to obtain collaboration signature information; receiving negotiation result data transmitted by the second device, the negotiation result data carrying the collaboration signature information, the shared public key, and the key verification parameter; and performing a consensus on the negotiation result data; and submitting the negotiation result data to a blockchain of the blockchain network when the consensus is verified.

An embodiment of this application further provides a computer storage medium (memory), and the computer storage medium is a memory device in a computer device and is configured to store programs and data. It may be understood that the computer storage medium herein may include an internal storage medium of the computer device and may also include an extended storage medium supported by the computer device. The computer storage medium provides storage space, and the storage space stores an operating system of the computer device. In addition, the storage space further stores one or more instructions suitable for being loaded and executed by the processor 801. The instructions may be one or more computer programs (including program code). The computer storage medium herein may be a high-speed RAM memory, or may be a non-volatile memory, such as at least one magnetic disk storage. In some embodiments, the computer storage medium may be at least one computer storage medium far away from the foregoing processor.

In an embodiment, if the computer device is the first device, the computer storage medium may store one or more first instructions; and the one or more first instructions in the computer storage medium may be loaded and executed by the processor 801 to implement corresponding steps in the key generation method of the side of the first device.

In an embodiment, if the computer device is the second device, the computer storage medium may store one or more second instructions; and the one or more second instructions in the computer storage medium may be loaded and executed by the processor 801 to implement corresponding steps in the key generation method of the side of the second device.

In an embodiment, if the computer device is the consensus node, the computer storage medium may store one or more third instructions; and the one or more third instructions in the computer storage medium may be loaded and executed by the processor 801 to implement corresponding steps in the key generation method of the side of the consensus node.

An embodiment of this application further provides a computer product, including instructions, the instructions, when run on a computer, causing the computer to perform the key generation method of the side of the first device, or the key generation method of the side of the second device, or the key generation method of the side of the consensus node.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A key generation method based on a blockchain network, performed by a first device, the method comprising:
    transmitting a key negotiation request to a consensus node in a blockchain network, to request a key verification parameter;
    negotiating a collaboration key pair with a second device when the key verification parameter returned by the consensus node is received, to obtain a first private key component and a shared public key in the collaboration key pair, a second private key component in the collaboration key pair being held by the second device, and the shared public key being used for verifying validity of collaboration signature information obtained by collaboration signature using the first private key component and the second private key component;
    signing the key verification parameter by using the first private key component, to obtain a first signature component;
    generating transaction data according to the first signature component and the key verification parameter; and
    transmitting the transaction data to the second device, the second device signing the transaction data by using the second private key component to obtain a second signature component, and obtaining the collaboration signature information according to the first signature component and the second signature component, and transmitting negotiation result data to the consensus node, the negotiation result data comprising the collaboration signature information, the shared public key, and the key verification parameter, wherein the consensus node performs a consensus on the negotiation result data, and after the negotiation result data passes the consensus, submits the negotiation result data to a blockchain of the blockchain network.

2. The method according to claim 1, wherein the negotiating the collaboration key pair with the second device, to obtain the first private key component and the shared public key in the collaboration key pair comprises:
    obtaining a random number agreed between the first device and the second device, the random number being generated by the first device or the second device using a random algorithm;
    generating the collaboration key pair according to the random number and by using a key algorithm, the collaboration key pair comprising a private key and a public key; and
    identifying the public key in the collaboration key pair as the shared public key, and splitting the private key in the collaboration key pair into the first private key component and the second private key component, the second private key component being transmitted to the second device.

3. The method according to claim 1, wherein the negotiating the collaboration key pair with the second device, to obtain the first private key component and the shared public key in the collaboration key pair comprises:
obtaining a random number agreed between the first device and the second device, the random number being generated by the first device or the second device using a random algorithm;
generating the first private key component and a first public key according to the random number and by using a key algorithm; and
receiving a second public key transmitted by the second device, and generating the shared public key according to the first public key and the second public key, the second public key being generated by the second device according to the random number and by using the key algorithm.

4. The method according to claim 1, further comprising:
generating negotiation information, the negotiation information being used for instructing the first device to request to negotiate the collaboration key pair with the second device;
generating a key negotiation notification according to the negotiation information, and transmitting the key negotiation notification to the second device; and
generating the key negotiation request when response information returned by the second device for the key negotiation notification is received.

5. The method according to claim 4, wherein the generating the key negotiation notification according to the negotiation information comprises:
signing the negotiation information by using a system private key of the first device, to obtain a system digital signature of the first device; and
generating the key negotiation notification by using the negotiation information and the system digital signature of the first device, the response information being transmitted after the second device agrees to negotiate the collaboration key pair with the first device and the system digital signature of the first device is verified by using a system public key of the first device.

6. The method according to claim 1, wherein the response information carries a system digital signature of the second device obtained by signing the key negotiation notification using a system private key of the second device.

7. The method according to claim 6, wherein the generating the key negotiation request when response information returned by the second device for the key negotiation notification is received comprises:
obtaining a system public key of the second device when the response information returned by the second device for the key negotiation notification is received, and verifying the system digital signature of the second device by using the system public key of the second device; and
generating, when the system digital signature of the second device is verified, the key negotiation request by using the system digital signature of the first device, the system digital signature of the second device, and the negotiation information.

8. A non-transitory computer storage medium, storing one or more first instructions, the one or more first instructions being suitable to be loaded by at least one processor to perform:
transmitting a key negotiation request to a consensus node in a blockchain network, to request a key verification parameter;
negotiating a collaboration key pair with a second device when the key verification parameter returned by the consensus node is received, to obtain a first private key component and a shared public key in the collaboration key pair, a second private key component in the collaboration key pair being held by the second device, and the shared public key being used for verifying validity of collaboration signature information obtained by collaboration signature using the first private key component and the second private key component;
signing the key verification parameter by using the first private key component, to obtain a first signature component;
generating transaction data according to the first signature component and the key verification parameter;
transmitting the transaction data to the second device, the second device signing the transaction data by using the second private key component to obtain a second signature component, and obtaining the collaboration signature information according to the first signature component and the second signature component, and transmitting negotiation result data to the consensus node, the negotiation result data comprising the collaboration signature information, the shared public key, and the key verification parameter; wherein the consensus node performs a consensus on the negotiation result data, and after the negotiation result data passes the consensus, submits the negotiation result data to a blockchain of the blockchain network.

9. The computer storage medium according to claim 8, wherein the negotiating the collaboration key pair with the second device, to obtain the first private key component and the shared public key in the collaboration key pair comprises:
obtaining a random number agreed between the first device and the second device, the random number being generated by the first device or the second device using a random algorithm;
generating the collaboration key pair according to the random number and by using a key algorithm, the collaboration key pair comprising a private key and a public key; and
identifying the public key in the collaboration key pair as the shared public key, and splitting the private key in the collaboration key pair into the first private key component and the second private key component, the second private key component being transmitted to the second device.

10. The computer storage medium according to claim 8, wherein the negotiating the collaboration key pair with the second device, to obtain the first private key component and the shared public key in the collaboration key pair comprises:
obtaining a random number agreed between the first device and the second device, the random number being generated by the first device or the second device using a random algorithm;
generating the first private key component and a first public key according to the random number and by using a key algorithm; and receiving a second public key transmitted by the second device, and generating the shared public key according to the first public key and the second public key, the second public key being generated by the second device according to the random number and by using the key algorithm.

11. The computer storage medium according to claim 8, the one or more first instructions further cause the at least one processor to perform:
generating negotiation information, the negotiation information being used for instructing the first device to request to negotiate the collaboration key pair with the second device;
generating a key negotiation notification according to the negotiation information, and transmitting the key negotiation notification to the second device; and
generating the key negotiation request when response information returned by the second device for the key negotiation notification is received.

12. The computer storage medium according to claim 11, wherein the generating the key negotiation notification according to the negotiation information comprises:
signing the negotiation information by using a system private key of the first device, to obtain a system digital signature of the first device; and
generating the key negotiation notification by using the negotiation information and the system digital signature of the first device, the response information being transmitted after the second device agrees to negotiate the collaboration key pair with the first device and the system digital signature of the first device is verified by using a system public key of the first device.

13. The computer storage medium according to claim 8, wherein the response information carries a system digital signature of the second device obtained by signing the key negotiation notification using a system private key of the second device.

14. The computer storage medium according to claim 13, wherein the generating the key negotiation request when response information returned by the second device for the key negotiation notification is received comprises:
obtaining a system public key of the second device when the response information returned by the second device for the key negotiation notification is received, and verifying the system digital signature of the second device by using the system public key of the second device; and
generating, when the system digital signature of the second device is verified, the key negotiation request by using the system digital signature of the first device, the system digital signature of the second device, and the negotiation information.

15. A first device on a blockchain network, comprising a memory, and a processor coupled to the memory and configured to perform:
transmitting a key negotiation request to a consensus node in a blockchain network, to request a key verification parameter;
negotiating a collaboration key pair with a second device when the key verification parameter returned by the consensus node is received, to obtain a first private key component and a shared public key in the collaboration key pair, a second private key component in the collaboration key pair being held by the second device, and the shared public key being used for verifying validity of collaboration signature information obtained by collaboration signature using the first private key component and the second private key component;
signing the key verification parameter by using the first private key component, to obtain a first signature component;
generating transaction data according to the first signature component and the key verification parameter;
transmitting the transaction data to the second device, the second device signing the transaction data by using the second private key component to obtain a second signature component, and obtaining the collaboration signature information according to the first signature component and the second signature component, and transmitting negotiation result data to the consensus node, the negotiation result data comprising the collaboration signature information, the shared public key, and the key verification parameter; wherein the consensus node performs a consensus on the negotiation result data, and after the negotiation result data passes the consensus, submits the negotiation result data to a blockchain of the blockchain network.

16. The device according to claim 15, wherein the negotiating the collaboration key pair with the second device, to obtain the first private key component and the shared public key in the collaboration key pair comprises:
obtaining a random number agreed between the first device and the second device, the random number being generated by the first device or the second device using a random algorithm;
generating the collaboration key pair according to the random number and by using a key algorithm, the collaboration key pair comprising a private key and a public key; and
identifying the public key in the collaboration key pair as the shared public key, and splitting the private key in the collaboration key pair into the first private key component and the second private key component, the second private key component being transmitted to the second device.

17. The device according to claim 15, wherein the negotiating the collaboration key pair with the second device, to obtain the first private key component and the shared public key in the collaboration key pair comprises:
obtaining a random number agreed between the first device and the second device, the random number being generated by the first device or the second device using a random algorithm;
generating the first private key component and a first public key according to the random number and by using a key algorithm; and
receiving a second public key transmitted by the second device, and generating the shared public key according to the first public key and the second public key, the second public key being generated by the second device according to the random number and by using the key algorithm.

18. The device according to claim 15, wherein the processor is further configured to perform:
generating negotiation information, the negotiation information being used for instructing the first device to request to negotiate the collaboration key pair with the second device;
generating a key negotiation notification according to the negotiation information, and transmitting the key negotiation notification to the second device; and generating the key negotiation request when response information returned by the second device for the key negotiation notification is received.

19. The device according to claim 18, wherein the generating the key negotiation notification according to the negotiation information comprises:
    signing the negotiation information by using a system private key of the first device, to obtain a system digital signature of the first device; and
    generating the key negotiation notification by using the negotiation information and the system digital signature of the first device, the response information being transmitted after the second device agrees to negotiate the collaboration key pair with the first device and the system digital signature of the first device is verified by using a system public key of the first device.

20. The device according to claim 15, wherein the response information carries a system digital signature of the second device obtained by signing the key negotiation notification using a system private key of the second device; and
    the generating the key negotiation request when response information returned by the second device for the key negotiation notification is received comprises:
    obtaining a system public key of the second device when the response information returned by the second device for the key negotiation notification is received, and verifying the system digital signature of the second device by using the system public key of the second device; and
    generating, when the system digital signature of the second device is verified, the key negotiation request by using the system digital signature of the first device, the system digital signature of the second device, and the negotiation information.

* * * * *